Oct. 5, 1954     R. C. HENSHAW     2,690,891
RESILIENT MOUNTING

Filed Aug. 5, 1950     2 Sheets-Sheet 1

Inventor
Richard C. Henshaw
By Ralph Hammar
Attorney

Oct. 5, 1954  R. C. HENSHAW  2,690,891
RESILIENT MOUNTING

Filed Aug. 5, 1950  2 Sheets–Sheet 2

Inventor
Richard C Henshaw
By Ralph Hammar
Attorney

Patented Oct. 5, 1954

2,690,891

UNITED STATES PATENT OFFICE 2,690,891

RESILIENT MOUNTING

Richard C. Henshaw, Erie, Pa., assignor to Lord Manufacturing Company, Erie, Pa., a corporation of Pennsylvania Application August 5, 1950, Serial No. 177,915

2 Claims. (Cl. 248—5)

This invention is intended to produce an improved mounting for overhung bodies such as radial air craft engines and the like. Further objects and advantages appear in the specification and claims.

Figure 1:
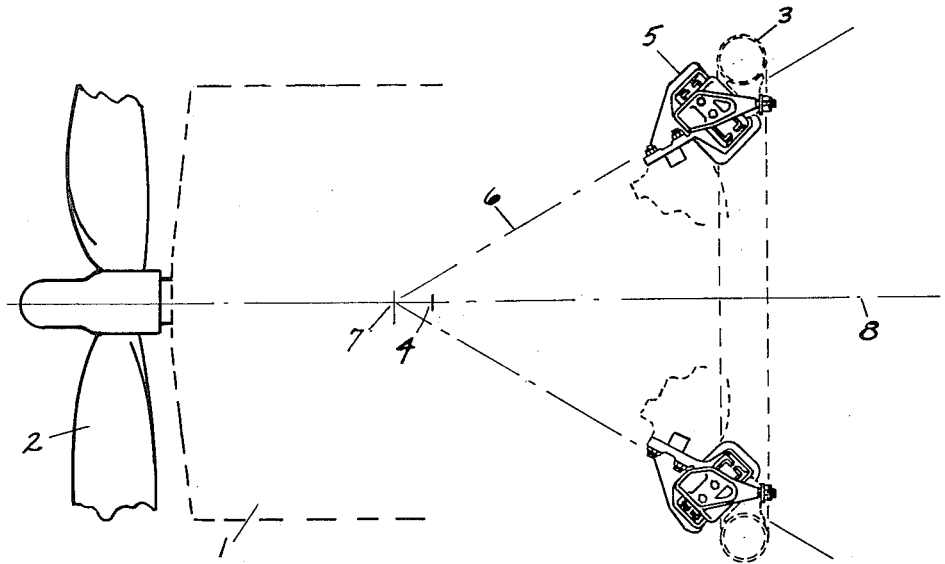
Figure 2:
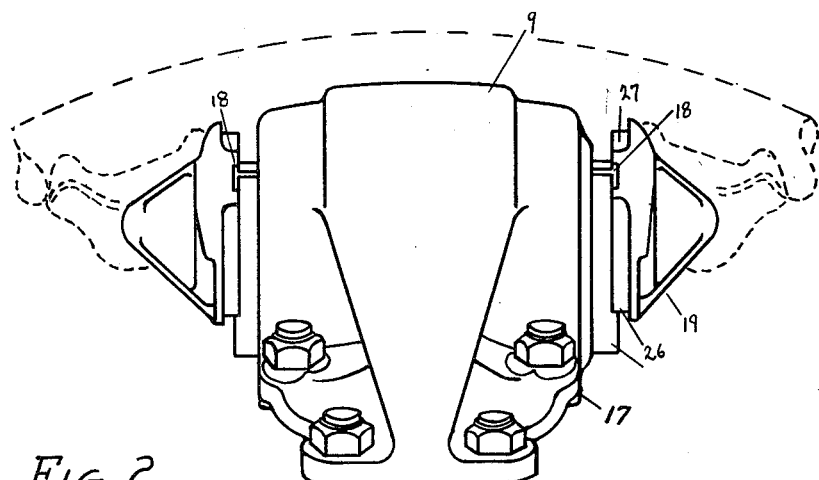
Figure 3:
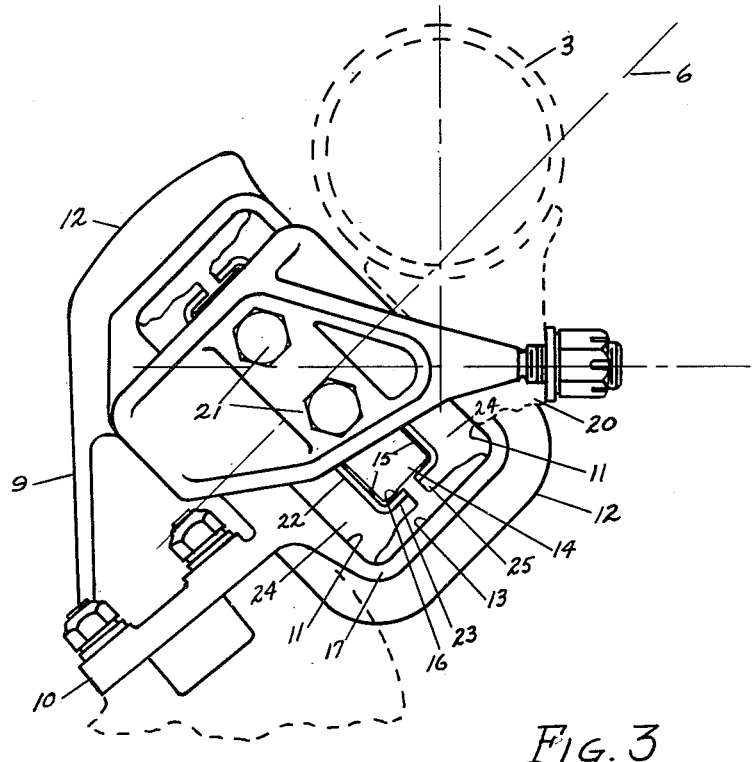
Figure 4:
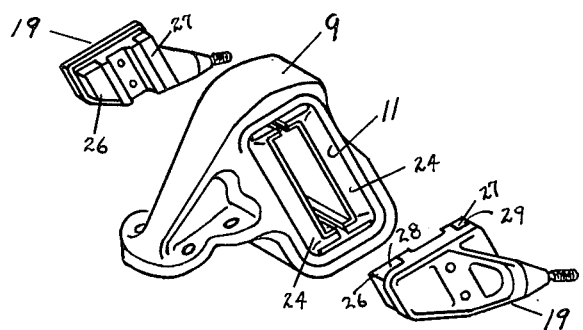

In the drawing, Fig. 1 is a side elevation of a typical installation, Fig. 2 is an enlarged front elevation of one of the mountings, Fig. 3 is a side elevation of one of the mountings and Fig. 4 is an exploded view of one of the mountings.

Referring to the drawings, 1 indicates a multiple row of radial engine, 2 a propeller carried by the engine, 3 an engine ring suitably supported by the air frame, 4 the center of gravity of the engine (the engine and parts carried thereby) and 5 mountings supporting the engine on the engine ring. The mountings are focused along axes 6 to a point 7 on the torque axis 8, the point 7 being sufficiently forward to the center of gravity 4 to produce an effective virtual suspension of the engine at the center of gravity 4.

Each of the mountings comprises a yoke 9 bolted to a pad 10 on the engine. The yoke has opposed surfaces 11 centered on and at right angles to the axis 6 and each tangent to a sphere having its center at point 7 on the torque axis of the engine. The yoke also has side walls 12 with inner surfaces 13 extending around the torque axis of the engine and parallel to the axis 6 and perpendicular to the surfaces 11.

Extending through the yoke is a generally flat core 14 having opposite surfaces 15 thereof presented to and spaced from the surfaces 11 of the yoke. The core also has edges 16 which are parallel to and spaced from the surfaces 13 of the yoke. The ends of the core project beyond the ends 17 of the yoke and the projecting ends have tongue and groove connections 18 with brackets 19 fixed to lugs 20 on the engine ring 3. The tongue and groove connections are supplemented by bolts 21 so that the ends of the core 14 are both keyed and fastened to the brackets 19.

On the surfaces 15 of the core are plates 22 which have flanges 23 overlapping the edge surfaces 16 of the core. Between each of the plates 22 and the adjacent surface 11 of the yoke is a body 24 of rubber or equivalent resilient material which is bonded by surface union to the surface 11 of the yoke and is also bonded to the outer surface of the plate 22 and the flanges 23. The bodies of resilient material are molded with the core 14 removed and when molded the flanges 23 extend almost into contact with each other and the plates 22 are separated by a distance less than the thickness of the core 14. When the core 14 is inserted between the plates 22, the rubber is accordingly compressed between the plates 22 and the adjacent surfaces 11 thereby preloading the rubber so that the plates will always remain in engagement with the core 14. The portions 25 of the rubber bonded to the flanges 23 are spaced from the surfaces 13 of the yoke and provide cushioning or snubbing stops. Further snubbing or cushioning stops are provided by bodies of rubber 26 and 27 bonded to surfaces 28 and 29 of the brackets 19 which overlap the ends 17 of the yoke.

In operation, torsional vibration of the engine is accommodated by stressing the rubber in shear in a direction endwise of the cores 14 and pitch and yaw vibration of the engine is accommodated by stressing the rubber in shear in a direction edgewise of the cores 14. After assembly, the core 14 and the plates 15 move as a unit. Snubbing or limiting on the amplitude of vibration in the torque direction is accomplished by the snubbing rubber 26 and 27 which engages the ends 17 of the yoke. Snubbing in the pitch and yaw direction is accomplished by the rubber 25 which engages the surfaces 13 of the yoke.

The construction of the mounting facilitates manufacture and installation. During molding the yokes 9 and the brackets 19 can be separately loaded into the mold. When molding the rubber into the yokes 9, no special provisions need be made for the shrinkage of the rubber upon cooling since the plates 22 are spread apart upon assembly of the cores 14 so as to pre-compress the rubber. The extension of the rubber along the flanges 23 in order to provide the snubbing portions 25 provides the extension of the bond surface which is desirable to prevent bond failure.

What I claim as new is:

1. In a resilient mounting, supporting and supported members, one of which comprises a unitary four-sided yoke open at its ends and having an opening extending through the yoke defined by the four sides of the yoke, two of the sides of the yoke constituting spaced opposed surfaces and the other two sides of the yoke comprising connecting side walls joining said surfaces, and the other of said members comprising a generally flat core between and having opposite surfaces thereof presented to and spaced inward from the respective opposed yoke surfaces and having edges spaced inward from the side walls connecting said opposed surfaces, said core extending through the opening in the yoke and having its ends projecting beyond the ends of the yoke, brackets fastened to the projecting ends of the core and extending past and overlapping the opposite ends of the yoke, plates engaging the opposite surfaces of the core, flanges on the plates engaging the edges of the core between said opposite surfaces and extending toward each other, said flanges being spaced from the inner surface of the side walls of the yoke and normally presented to each other, bodies of resilient material such as rubber between and bonded by surface union directly to the plates and to the opposed surfaces of the yoke and spaced from the side walls of the yoke, the plates being normally spaced apart by the unstressed position of the rubber less than the thickness of the core whereby the rubber bodies are compressed against the opposed surfaces of the yoke when the core is inserted between the plates.

2. In a resilient mounting, supporting and supported members, one of which comprises a unitary four-sided yoke open at its ends and having an opening extending through the yoke defined by the four sides of the yoke, two of the sides of the yoke constituting spaced opposed surfaces and the other two sides of the yoke comprising connecting side walls joining said surfaces, and the other of said members comprising a generally flat core between and having opposite surfaces thereof presented to and spaced inward from the respective opposed yoke surfaces and having edges spaced inward from the side walls connecting said opposed surfaces, said core extending through the opening in the yoke and having its ends projecting beyond the ends of the yoke, brackets fastened to the projecting ends of the yoke and extending past and overlapping one of said opposite surfaces of the yoke, said yoke having side walls spaced from the edges of the core, plates engaging the opposite surfaces of the core, flanges on the plates engaging the edges of the core between said opposite surfaces and extending toward each other, bodies of resilient material such as rubber between and bonded by surface union directly to the plates and to the opposed surfaces of the yoke and to the flanges, the rubber bonded to the flanges being presented to and spaced from the side walls of the yoke to provide snubbing cushions.

References Cited in the file of this patent

UNITED STATES PATENTS

| Number | Name | Date |
|---|---|---|
| 1,472,371 | Masury et al. | Oct. 30, 1923 |
| 1,862,484 | Lord et al. | June 7, 1932 |
| 1,980,541 | Lee | Nov. 13, 1934 |
| 2,260,978 | Klein et al. | Oct. 28, 1941 |
| 2,287,316 | Lord | June 23, 1942 |
| 2,308,458 | Saurer | Jan. 12, 1943 |
| 2,342,577 | Gehman | Feb. 22, 1944 |
| 2,365,421 | Lord | Dec. 19, 1944 |
| 2,411,562 | Thompson | Nov. 26, 1946 |

FOREIGN PATENTS

| Number | Country | Date |
|---|---|---|
| 852,509 | France | Oct. 30, 1939 |